United States Patent [19]

Hehl

[11] 3,915,358
[45] Oct. 28, 1975

[54] LEVER ACTUATED PRESSURE RESPONSIVE INJECTION NOZZLE

[76] Inventor: Karl Hehl, Arthur-Hehl-Strasse 32, 7291 Lossburg, Germany

[22] Filed: Mar. 3, 1975

[21] Appl. No.: 554,571

Related U.S. Application Data

[63] Continuation-in-part of Ser. No. 488,964, July 16, 1974.

[30] Foreign Application Priority Data

Mar. 1, 1974  Germany.......................... 2409814

[52] U.S. Cl. ............ 222/496; 222/559; 425/245 NS
[51] Int. Cl.² ............................................. B29F 1/03
[58] Field of Search ........... 251/250, 321, 325, 353; 222/492, 493, 496, 413, 509, 514, 518, 522, 525, 559; 425/245 R, 245 NS

[56] References Cited
UNITED STATES PATENTS

| | | | |
|---|---|---|---|
| 3,295,169 | 1/1967 | Moslo | 425/245 X |
| 3,398,436 | 8/1968 | Nouel | 425/245 X |
| 3,632,260 | 1/1972 | Moslo | 425/245 |
| 3,709,644 | 1/1973 | Farrell | 425/245 X |
| 3,719,310 | 3/1973 | Hünten | 425/245 X |

FOREIGN PATENTS OR APPLICATIONS

| | | | |
|---|---|---|---|
| 656,120 | 9/1963 | Italy | 425/245 |
| 84,461 | 1/1965 | France | 425/245 |

*Primary Examiner*—Robert B. Reeves
*Assistant Examiner*—David A. Scherbel
*Attorney, Agent, or Firm*—Joseph A. Geiger

[57] ABSTRACT

A lever-actuated injector nozzle for attachment to variously sized injection units of injection molding machines, the nozzle having front and rear extensions on its nozzle body for the mounting thereon of interchangeable end plugs and threaded sleeves fitting different plastification cylinders, and for the mounting of either interchangeable nozzle caps, or a clamping cap with interchangeable nozzle heads, for the adaptation of the injection orifice to different material and molding die specifications.

10 Claims, 6 Drawing Figures

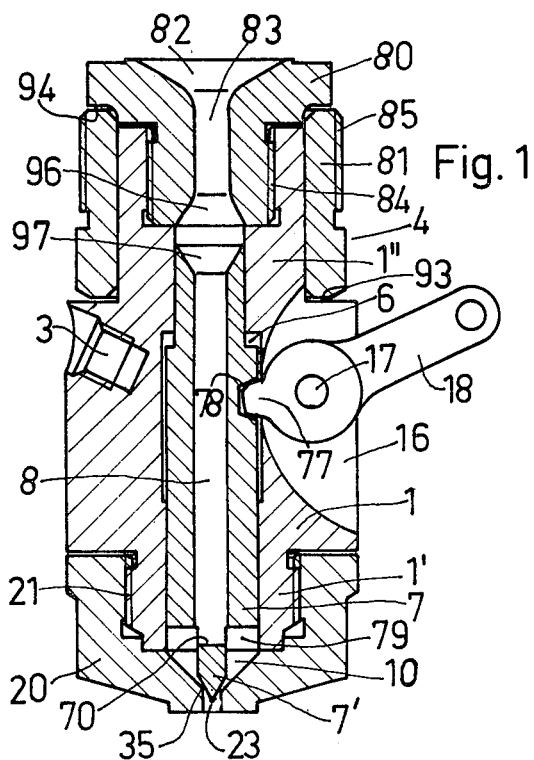
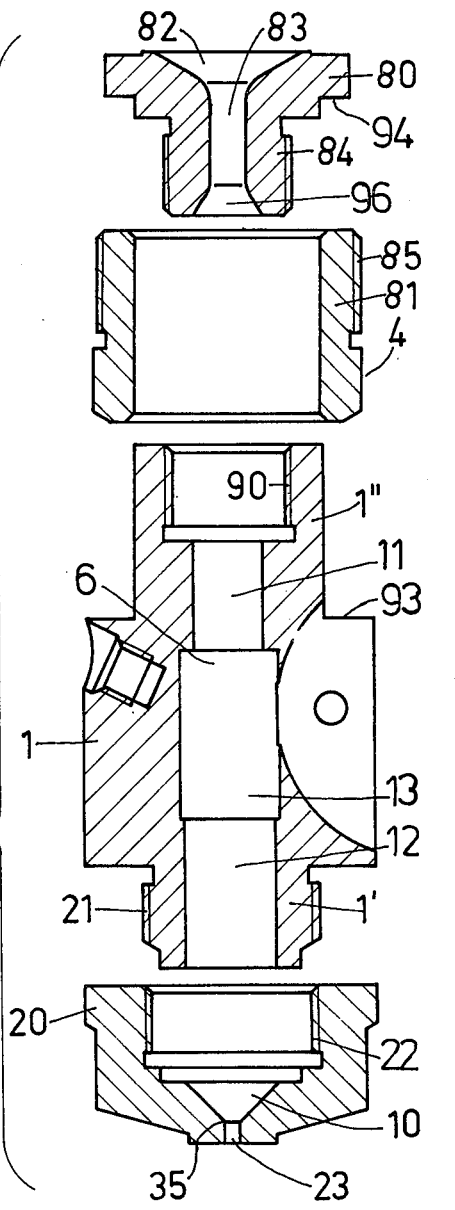
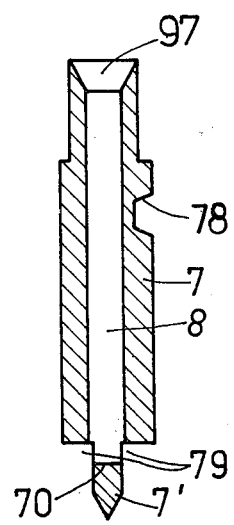
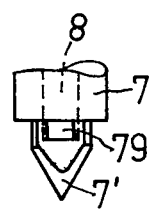
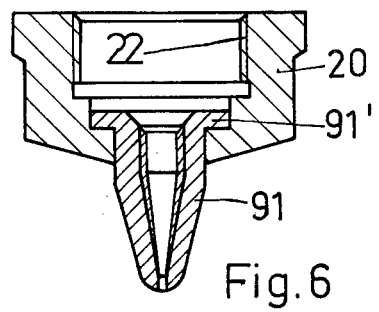

LEVER ACTUATED PRESSURE RESPONSIVE INJECTION NOZZLE

RELATED APPLICATIONS

This application is a continuation-in-part of my co-pending application Ser. No. 488,964, filed July 16, 1974.

BACKGROUND OF THE INVENTION

1. Field of the Invention

The present invention relates to injector nozzles for injection molding machines, and in particular to nozzles which are removably attachable to the front end of the plastification cylinder of an injection unit and which are forcibly openable and/or closable by means of a reciprocating lever to which is attached a closing spring or a valve actuating mechanism.

2. Description of the Prior Art

Various injector nozzles with closing valves are known from the prior art. In most cases, they feature a centrally guided valve plunger which is spring biased toward its closed position, and which, under the pressure produced by the injection unit to which it is attached, retracts and opens a valve passage for injection of the raw material into the molding die.

In my co-pending application Ser. No. 488,964, filed July 16, 1974, I am disclosing two different embodiments of a lever-actuated injector nozzle featuring a valve body which can be threaded into the forward end of the plastification cylinder of an injection unit, and which accommodates in its central bore an axially movable hollow valve plunger cooperating with a pivotable actuating lever which may have a spring attached thereto, or which, in an alternative operating mode, may be linked to a hydraulic valve actuating mechanism.

Injector nozzles of this type are precision assemblies, however, and they are subject to considerable wear, if plastic materials with abrasive fillers are processed. And because each size of plastification cylinder required an injector nozzle of matching size, it has in the past been necessary to provide tooling and spare parts for a number of different sizes of injector nozzles.

SUMMARY OF THE INVENTION

Underlying the present invention is the primary objective of providing an improved configuration of an injector nozzle which is readily adaptable to be mounted to any one of a plurality of plastification cylinders of varying diameter and which is also adaptable for injection into different injection molds, through the interchangeability of the mounting components, on the one hand, and the interchangeability of the nozzle tip, on the other hand.

The present invention proposes to achieve this by suggesting an injector nozzle assembly in which the nozzle body includes a reduced-diameter cylindrical rear portion carrying an interchangeable threaded sleeve which is axially retained on the valve body by means of a likewise interchangeable end plug. The threaded sleeve and cooperating end plug are designed to engage a matching bore in the forward extremity of a plastification cylinder. A set of interchangeable threaded sleeves and end plugs thus makes it possible to adapt a nozzle of standardized dimensions to a number of different injection units.

The proposed injector nozzle also features a removable nozzle cap on its forward end which engages the nozzle body by means of a thread connection. A similar set of interchangeable nozzle caps makes it possible to adapt the injector nozzle to different flow characteristics of various plastic materials, by providing different injection orifices in the interchangeable nozzle caps. The invention further suggests, as an alternative to interchangeable nozzle caps, a removable clamping cap which holds an interchangeable nozzle head or nozzle tip of special material, the latter being particularly advantageous when highly abrasive plastic materials are processed.

This modular design of the injector nozzle thus makes it possible to "customize" the injection nozzle for a variety of machine configurations and material requirements, while using standardized parts for the basic injector nozzle assembly consisting of the nozzle body, valve plunger, and actuating lever.

The adaptability of this injector nozzle through the use of interchangeable threaded sleeves and end plugs makes it possible to adapt each end plug to the shape of the particular plastification screw, by providing a flared entry portion in the end plug which matches the extremity of the plastification screw, thereby minimizing the volume of plastic material which remains trapped between the end plug and the plastification screw at the end of the injection stroke.

The provision of interchangeable special nozzle tips, in conjunction with the removable clamping cap, not only simplifies the problem of spare parts, it also greatly reduces manufacturing costs by holding the nozzle tip, which is made of expensive material and difficult to machine, to the most simple shape with the smallest possible dimensions. Such a special nozzle tip may, for instance, be made of an extremely hard, abrasion resistant beryllium alloy.

BRIEF DESCRIPTION OF THE DRAWINGS

Further special features and advantages will become apparent from the description following below, when taken together with the accompanying drawings which illustrate, by way of example, an embodiment of the invention, represented in the various figures as follows:

FIG. 1 illustrates, in a longitudinal cross section, a lever-actuated injector nozzle embodying the present invention;

FIG. 2 shows the constituent elements of the injector nozzle of FIG. 1, without the valve plunger and actuating lever, in an axially exploded view;

FIG. 3 shows the valve plunger of FIG. 1;

FIG. 4 shows the tip of the valve plunger of FIG. 3 in a 90°-rotated view;

FIG. 5 shows the valve plunger as seen in the axial direction; and

FIG. 6 shows a modified nozzle cap with an interchangeable nozzle tip.

DESCRIPTION OF THE PREFERRED EMBODIMENT

An injector nozzle according to the present invention is illustrated in a longitudinal cross section in FIG. 1; its constituent parts are shown in FIGS. 2–5. This injector nozzle consists essentially of a nozzle body 1 having a central guide bore 6 extending longitudinally therethrough and front and rear extensions 1' and 1", respectively, of reduced diameter. The rear extension 1", which is concentric with the guide bore 6, presents a smooth cylindrical outer diameter, whereas the front extension 1' has a male thread 21. Inside the rear extension is further provided a female thread 90 which is engaged by the male thread 84 of an end plug 80 of rearwardly enlarged diameter. A threaded sleeve 81, fitted on the outer diameter of the rear extension 1'' of the nozzle body, is axially retained thereon between a rear shoulder 93 of the nozzle body 1 and a cooperating shoulder 94 of the end plug 80. The threaded sleeve 81, having a male thread 85 on its rear portion and flat peripheral faces 4 on its forward portion, thus serves as a clamping member for the mounting of the injector nozzle in a suitable plastification cylinder (not shown) of an injection unit. That cylinder thus has a recessed bore accommodating the collar portion of the end plug 80 and a female thread cooperating with the male thread 85 of sleeve 81. The flat faces 4 of the sleeve are designed for engagement with a wrench. The collar portion of the end plug 80 may have similar flat faces.

The end plug 80 has a central axial bore 83 with a flared portion 82 at its rear extremity and a tapered exit portion 96 at its forward extremity. The flared bore portions 82 is so shaped that it matches a tapered end portion of the plastification screw which, when fully extended at the end of an injection stroke, thus displaces virtually all the plastic material accumulated behind the end plug.

Different injection units with plastification cylinders and plastification screws of varying diameters, can be equipped with basically identical injector nozzles, if the end plug 80 and the threaded sleeve 81 are adapted accordingly. For this purpose, the invention provides that adaptor sets of end plugs 80 and sleeves 81 are provided for each injection unit. In each case, the flared portion 82 of the end plug 80 matches the forward extremity of the plastification screw, and the outer diameters of the plug 80 and thread 85 of sleeve 81 are adapted to the diameter of the plastification cylinder.

The central guide bore 6 of the nozzle body 1 is subdivided into three successive length portions of different diameter. Between a smaller rear guide portion 11 and a larger forward guide portion 12 is located a central clearance bore 13. A valve plunger 7 engages these forward and rear guide portions of bore 6 with matching differential diameters, so as to operate as a differential piston. Through the valve plunger 7 extends an axial injection channel 8 which opens at the forward end of the plunger 7 into two diametrally opposed lateral exit openings 79, located behind a flat bottom face 70 of the injector channel 8. This portion of the valve plunger 7 is illustrated in more detail in FIGS. 4 and 5, where it can be seen that the lateral exit openings 79 are the result of opposite flat faces which have been milled on the tapered pin extension 7' at the forward extremity of the valve plunger 7.

A nozzle cap 20, having a female thread 22 for engagement with the male thread 21 of the front extension 1' of the nozzle body, holds the valve plunger 7 in place, by presenting a valve seat 35 which engages the tapered portion of the pin extension 7' of the plunger 7. An injection orifice 23 leads forwardly from the valve seat 35, while a tapered bore portion of the nozzle cap 20 and a portion of the guide bore 12 form an antechamber 10 around the pin extension 7' of the valve plunger. The nozzle cap 20 has suitable flat faces on the upper portion of its periphery for engagement with a wrench.

The diameter of the injection channel 8 is preferably identical to the diameter of the center bore 83 of the end plug 80. For purposes of a smooth material flow, both the end plug 80 and the valve plunger 7 have suitable exit tapers 96 and entry tapers 97 on their central bores 83 and 8, respectively.

An actuating lever 18, received inside a longitudinal slot 16 of the nozzle body 1 and pivotable around a transverse pivot pin 17, engages a drive notch 78 in the valve plunger 7 by means of a drive cam 77. This drive engagement converts the axial motion of the valve plunger 7 into a pivoting motion of the actuating lever 18, and vice versa. The actuating lever 18 may be connected either to a closing spring urging the valve plunger forwardly against its valve seat 35, or it may be connected to a hydraulic valve actuating mechanism as described in my earlier-mentioned co-pending application Ser. No. 488,964.

As can readily be seen from FIG. 1, a buildup of injection pressure inside the channels 83 and 8 and inside the antechamber 10 causes the valve plunger 7 to act as a differential piston, moving rearwardly under this pressure, so as to open the injection orifice 23. The closing bias on the actuating lever 18, or the operative conditions of a closing mechanism attached thereto, are of course adapted in each case to the required injection pressure and other injection conditions, as may be necessary for different materials and injection cycles. A lateral threaded socket 3 in the nozzle body 1 serves for the accommodation of a suitable temperature gauge (not shown).

The versatility of the injector nozzle described hereinabove can be further extended by adding adaptability to the front or injection end of the injector nozzle. This can be achieved by replacing the nozzle cap 20 of FIGS. 1 and 2 with a modified nozzle head, using a clamping cap 20', as shown in FIG. 6, which holds an interchangeable nozzle tip 91. The latter has an enlarged flange 91' with which it is clamped against the forward end face of the nozzle body 1. Such a special nozzle tip may extend forwardly from the injector nozzle, as is the case with the tip shown in FIG. 6, this tip being adapted to penetrate into the injection molding die, thereby constituting a core portion of the die. The interchangeability of special nozzle tips of this type makes it possible to quickly replace these tips, if necessary, and/or to manufacture them from expensive material in a minimum of manufacturing operations. Such nozzle tips may, for example, be made of an extremely hard beryllium alloy.

It should be understood, of course, that the foregoing disclosure describes only a preferred embodiment of the invention and that it is intended to cover all changes and modifications of this example of the invention which fall within the scope of the appended claims.

I claim the following:

1. An injector nozzle adapted to be threaded into the forward extremity of the plastification cylinder of an injection unit, so as to face the plastification screw which rotates and axially moves inside said cylinder, thereby first plastifying and then injecting plastic raw material into the injection molding die of an injection molding machine through the injector nozzle, said injector nozzle comprising in combination:

an elongated nozzle body having a rear mounting end and a front discharge end;

a center bore extending axially through the nozzle body and including, as portions thereof, a large front guide bore, a smaller rear guide bore, and an enlarged female-threaded recess behind the rear guide bore, at the rear extremity of the nozzle body;

a valve plunger received inside the center bore of the nozzle body for axial movement therein, the plunger having rear and front diameters fitting said smaller rear guide bore and larger front guide bore, respectively;

an injection channel extending axially through the valve plunger so as to allow plastic material to flow therethrough and to impinge on both ends of the valve plunger, which latter thereby acts as a differential piston, being urged rearwardly by the pressure in the plastic material;

a reduced-diameter rearward extension on the nozzle body forming a rearwardly facing shoulder and a seating portion;

a hollow end plug threaded into the threaded recess of the nozzle body and having a forwardly facing clamping shoulder;

a threaded sleeve rotatably supported on the seating portion of the nozzle body extension and axially confined between the shoulder of the latter and the clamping shoulder of the end plug, respectively, the sleeve having a male thread whose diameter is larger than that of the end plug; the end plug and threaded sleeve being adapted to engage a matching recess and female thread in the plastification cylinder of an injection unit;

a reduced-diameter front extension on the nozzle body with a male thread thereon;

a nozzle head which is interchangeably attachable to the front extension of the nozzle body, the nozzle head having a central bore extending axially therethrough, said bore including a narrow injection orifice at its front end and a rearwardly facing valve seat located axially behind the injection orifice;

a pin extension on the forward end of the valve plunger having a seating portion shaped to cooperate with the valve seat of the nozzle head;

means for clamping the nozzle head to the front extension of the nozzle body; and means for biasing the valve plunger forwardly toward the closed position of its pin extension on the valve seat, in opposition to the differential piston action of the valve plunger.

2. An injector nozzle as defined in claim 1, wherein the hollow end plug attached to the rear extremity of the nozzle body has an axially extending center bore of a diameter which is comparable to the diameter of the injection channel of the valve plunger, the center bore opening rearwardly into a flared bore portion of a shape which substantially matches the shape of the plastification screw with which the injector nozzle is to cooperate.

3. An injector nozzle as defined in claim 2, wherein: the hollow end plug further has on the forward extremity of its center bore a tapered bore portion which opens to the diameter of the rear guide bore of the nozzle body; and the valve plunger has on the rear extremity of its injection channel a similarly opening tapered bore portion.

4. An injector nozzle as defined in claim 2, wherein:
the hollow end plug has a collar portion defining said clamping shoulder on the forward axial side thereof, and flat faces on the periphery of the collar portion for engagement by a wrench; and the threaded sleeve has similar flat faces on the periphery of a portion of its length.

5. An injector nozzle as defined in claim 1, wherein:
the nozzle head includes a small hollow nozzle tip and an enlarged clamping flange at its rear extremity; and the clamping means for the nozzle head is a clamping cap with a recessed bore adapted to receive therein the flange of the nozzle head, the clamping cap having a female thread cooperating with the male thread of the front extension of the nozzle body.

6. An injector nozzle as defined in claim 5, wherein the valve seat of the nozzle head is arranged at the rear extremity of the nozzle tip, at the level of the clamping flange.

7. An injector nozzle as defined in claim 5, wherein the nozzle head extends axially away from the nozzle, having outwardly the shape of a slim cone adapted for engagement into a matching cavity of an injection molding die, thereby constituting a core portion of the latter.

8. An injector nozzle as defined in claim 7, wherein the nozzle head is made of a hard, abrasion resistant beryllium alloy.

9. An injector nozzle adapted to be threaded into the forward extremity of the plastification cylinder of an injection unit, so as to face the plastification screw which rotates and axially moves inside said cylinder, thereby first plastifying and then injecting plastic raw material into the injection molding die of an injection molding machine through the injector nozzle, said injector nozzle comprising in combination:

an elongated nozzle body having a rear mounting end and a front discharge end;

a center bore extending axially through the nozzle body and including, as portions thereof, a large front guide bore, a smaller rear guide bore, and an enlarged female-threaded recess behind the rear guide bore, at the rear extremity of the nozzle body;

a valve plunger received inside the center bore of the nozzle body for axial movement therein, the plunger having rear and front diameters fitting said smaller rear guide bore and larger front guide bore, respectively;

an injection channel extending axially through the valve plunger so as to allow plastic material to flow therethrough and to impinge on both ends of the valve plunger, which latter thereby acts as a differential piston, being urged rearwardly under the pressure in the plastic material;

a rearward extension on the nozzle body forming a seating portion;

a hollow end plug threaded into the threaded recess of the nozzle body and having a forwardly facing clamping shoulder of a diameter which is larger than that of the seating portion; and a threaded sleeve rotatably supported on said seating portion of the nozzle body extension and axially engaging the clamping shoulder of the end plug; and wherein said sleeve has a male thread of a diameter which is larger than the diameter of the end plug;

the end plug and the threaded sleeve are adapted to engage a matching recess and female thread in the forward extremity of a plastification cylinder of an injection unit; and the threaded sleeve includes means engageable by a wrench for tightening and releasing it from said female thread.

10. An injector nozzle as defined in claim 9, wherein the nozzle body further includes rearwardly facing shoulder means at the forward end of its seating portion for axially abutting the threaded sleeve thereagainst.

\* \* \* \* \*